(12) United States Patent
Tischendorf et al.

(10) Patent No.: US 12,472,934 B1
(45) Date of Patent: Nov. 18, 2025

(54) ENGINE TORQUE CONTROL DURING WHEEL SHAFT DISCONNECT TRANSITIONS ON SERIES HYBRID POWERTRAINS

(71) Applicant: FCA US LLC, Auburn Hills, MI (US)

(72) Inventors: Christoph Tischendorf, Auburn Hills, MI (US); Ashay Sharma, Auburn Hills, MI (US); Nadirsh Patel, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/925,175

(22) Filed: Oct. 24, 2024

(51) Int. Cl.
| | |
|---|---|
| *B60W 10/06* | (2006.01) |
| *B60W 10/119* | (2012.01) |
| *B60W 20/10* | (2016.01) |
| *B60W 20/40* | (2016.01) |

(52) U.S. Cl.
CPC ............ *B60W 20/40* (2013.01); *B60W 10/06* (2013.01); *B60W 10/119* (2013.01); *B60W 20/10* (2013.01); *B60W 2540/10* (2013.01); *B60W 2710/0666* (2013.01)

(58) Field of Classification Search
CPC .... B60W 10/02; B60W 10/06; B60W 10/119; B60W 20/10; B60W 20/40; B60W 2510/0208; B60W 2540/10; B60W 2710/0666; B60K 6/46
USPC .............................. 701/51, 54, 22, 101; 477/5
See application file for complete search history.

(56) References Cited

U.S. PATENT DOCUMENTS

| | | | | |
|---|---|---|---|---|
| 5,988,307 | A | * 11/1999 | Yamada | ............... B60K 17/356 903/906 |
| 7,131,510 | B2 | 11/2006 | Mesiti et al. | |
| 8,195,370 | B2 | 6/2012 | Simon, Jr. et al. | |
| 8,608,617 | B2 | 12/2013 | Stervik | |
| 10,293,810 | B2 | 5/2019 | Wang et al. | |
| 11,377,090 | B2 | 7/2022 | Blue et al. | |
| 2004/0040759 | A1 | * 3/2004 | Shimizu | ............... B60W 20/15 180/65.265 |
| 2014/0163795 | A1 | * 6/2014 | Omi | ...................... B60K 6/442 180/65.265 |
| 2015/0197239 | A1 | * 7/2015 | Vilar | ....................... B60K 6/52 180/65.265 |

(Continued)

FOREIGN PATENT DOCUMENTS

CN 116394917 A 7/2023

*Primary Examiner* — Roger L Pang

(74) *Attorney, Agent, or Firm* — Jeremy J. Klobuccar

(57) ABSTRACT

An engine torque control method for an electrified vehicle having a series hybrid powertrain with at least two electric traction motors includes, in response to detecting an open-to-closed state transition of a drive shaft disconnect system configured to selectively connect and disconnect a first axle system or a pair of first wheels of the electrified vehicle from a first electric traction motor of the series hybrid powertrain, determining an optimum engine torque for the open-to-closed state transition based on a set of parameters for the open state of the drive shaft disconnect system, determining engine torque constraints for the open state and the closed state of the drive shaft disconnect system, applying the engine torque constraints to the optimum engine torque for the open-to-closed state transition to obtain a final engine torque command, and controlling an engine of the series (Continued)

hybrid powertrain based on the final engine torque command.

18 Claims, 3 Drawing Sheets

(56) References Cited

U.S. PATENT DOCUMENTS

2024/0157932 A1   5/2024   Tomoda et al.

* cited by examiner

ENGINE TORQUE CONTROL DURING WHEEL SHAFT DISCONNECT TRANSITIONS ON SERIES HYBRID POWERTRAINS

FIELD

The present application generally relates to electrified vehicles and, more particularly, to engine torque control during wheel shaft disconnect transitions on series hybrid powertrains.

BACKGROUND

In electrified vehicles having series hybrid powertrains, the engine does not directly contribute to vehicle propulsion. Instead, the engine, via a motor-generator unit (MGU), supports a high voltage electrical system (e.g., a high voltage battery pack or system) that powers one or more electric motors for vehicle propulsion. In a dual traction motor series hybrid powertrain, a first electric traction motor is associated with a front axle and a second electric traction motor associated with a rear axle. These powertrains further include a drive shaft disconnect system (a front axle disconnect, or FAD, wheel end disconnects, or WEDs, etc.) that act as separation modules between a particular electric traction motor and the respective vehicle wheels.

In such systems, the overall output power of the powertrain depends on the state of the drive shaft disconnect system. In the case of a wide-open throttle (WOT) during an open state of the drive shaft disconnect system, conventional control systems wait to increase the engine torque until the drive shaft disconnect system is closed, thereby resulting in a delay (e.g., when the torque request exceeds what the first/second electric motors are currently capable of providing without the support of the engine). Accordingly, while such conventional engine torque control systems for series hybrid powertrains having two or more electric traction motors do work for their intended purpose, there exists an opportunity for improvement in the relevant art.

SUMMARY

According to one example aspect of the invention, an engine torque control system for an electrified vehicle having a series hybrid powertrain with at least two electric traction motors is presented. In one exemplary implementation, the engine torque control system comprises a drive shaft disconnect system configured to selectively connect and disconnect a first axle system or a pair of first wheels of the electrified vehicle from a first electric traction motor of the series hybrid powertrain and a control system configured to detect an open-to-closed state transition of the drive shaft disconnect system based on a driver torque request and, in response to detecting the open-to-closed state transition, determine an optimum engine torque for the open-to-closed state transition based on a set of parameters for the open state of the drive shaft disconnect system, determine engine torque constraints for the open state and the closed state of the drive shaft disconnect system, apply the engine torque constraints to the optimum engine torque for the open-to-closed state transition to obtain a final engine torque command, and control an engine of the series hybrid powertrain based on the final engine torque command.

In some implementations, the control system is further configured to determine a minimum engine torque constraint based on a set of parameters for the closed state of the drive shaft disconnect system. In some implementations, the control system is further configured to determine a maximum of the optimum engine torque and the minimum engine torque constraint to obtain a constrained engine torque. In some implementations, the control system is further configured to determine a maximum engine torque constraint based on the set of parameters for the open state of the drive shaft disconnect system. In some implementations, the control system is further configured to determine a minimum of the constrained engine torque and the maximum engine torque constraint to obtain the final engine torque command.

In some implementations, the engine is connected to a motor-generator unit (MGU) that is configured to convert mechanical energy generated by the engine to electrical energy for recharging a high voltage battery system of the electrified vehicle, and wherein the high voltage battery system is configured to power the first electric traction motor and a second electric traction motor associated with a second axle system or a pair of second wheels of the electrified vehicle. In some implementations, the first axle system is a front axle system, the pair of first wheels are a pair of front wheels, the second axle system is a rear axle system, and the pair of second wheels are a pair of rear wheels. In some implementations, the drive shaft disconnect system is a front axle disconnect (FAD) unit. In some implementations, the drive shaft disconnect system includes a pair of wheel end disconnect (WED) units.

According to another aspect of the invention, an engine torque control method for an electrified vehicle having a series hybrid powertrain with at least two electric traction motors is presented. In one exemplary implementation, the engine torque control method comprises detecting, by a control system of the electrified vehicle, an open-to-closed state transition of a drive shaft disconnect system based on a driver torque request, wherein the drive shaft disconnect system is configured to selectively connect and disconnect a first axle system or a pair of first wheels of the electrified vehicle from a first electric traction motor of the series hybrid powertrain and, in response to detecting the open-to-closed state transition, determining, by the control system, an optimum engine torque for the open-to-closed state transition based on a set of parameters for the open state of the drive shaft disconnect system, determining, by the control system, engine torque constraints for the open state and the closed state of the drive shaft disconnect system, applying, by the control system, the engine torque constraints to the optimum engine torque for the open-to-closed state transition to obtain a final engine torque command, and controlling, by the control system, an engine of the series hybrid powertrain based on the final engine torque command.

In some implementations, the engine torque control method further comprises determining, by the control system, a minimum engine torque constraint based on a set of parameters for the closed state of the drive shaft disconnect system. In some implementations, the engine torque control method further comprises determining, by the control system, a maximum of the optimum engine torque and the minimum engine torque constraint to obtain a constrained engine torque. In some implementations, the engine torque control method further comprises determining, by the control system, a maximum engine torque constraint based on the set of parameters for the open state of the drive shaft disconnect system. In some implementations, the engine torque control method further comprises determining, by the control system, a minimum of the constrained engine torque and the maximum engine torque constraint to obtain the final engine torque command.

In some implementations, the engine is connected to an MGU that is configured to convert mechanical energy generated by the engine to electrical energy for recharging a high voltage battery system of the electrified vehicle, and wherein the high voltage battery system is configured to power the first electric traction motor and a second electric traction motor associated with a second axle system or a pair of second wheels of the electrified vehicle. In some implementations, the first axle system is a front axle system, the pair of first wheels are a pair of front wheels, the second axle system is a rear axle system, and the pair of second wheels are a pair of rear wheels. In some implementations, the drive shaft disconnect system is an FAD unit. In some implementations, the drive shaft disconnect system includes a pair of WED units.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

The present application is directed to techniques that mitigate or eliminate the above-described delay during drive shaft disconnect system closing transitions in series hybrid powertrains having front/rear axle electric motors. An engine torque optimizer calculates a most efficient engine torque command at the current range state. Additionally, there are two hybrid system constraint software components: (1) calculating a minimum engine torque to fulfill driver demand at the target range state and (2) calculating a maximum engine torque to fulfill driver demand at the current range state. To achieve the engine torque command which is closest to the future range state driver demand while at the same time fulfilling the driver demand at the current range state, the optimum engine torque command solution from the optimizer is maximum-clipped with the minimum engine torque command at the future range state and consecutively minimum-clipped to the maximum engine torque command at the current range state. Potential benefits of these techniques can provide a quicker driver demand torque fulfillment during drive shaft disconnect system closing transitions, particularly from low/medium accelerator pedal positions to high/WOT accelerator pedal positions and when the high voltage battery system has low power availability (i.e., low state of charge, or SOC). This could be important from both performance and safety perspectives (e.g., immediate torque for overtaking maneuvers).

Figure 1:
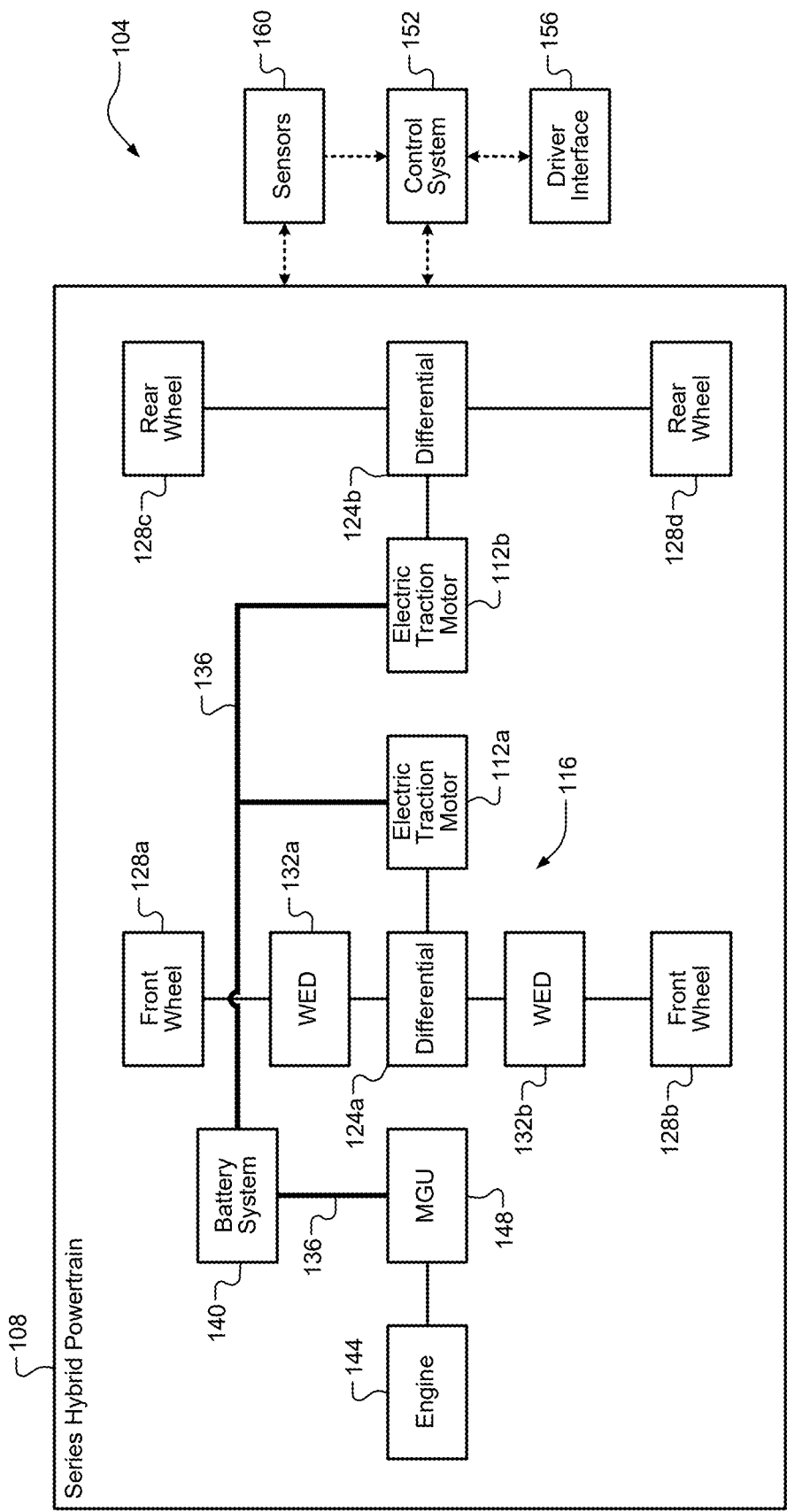
FIG. 1 is a functional block diagram of an electrified vehicle having a series hybrid powertrain with at least two electric traction motors and a drive shaft disconnect system according to the principles of the present application.

Referring now to FIG. 1, a functional block diagram of an electrified vehicle 100 having a series hybrid powertrain 108 with at least two electric traction motors 112a, 112b (collectively, "electric traction motors 112") and a drive shaft disconnect system 116 according to the principles of the present application is illustrated. The first electric traction motor 112a (also "front electric traction motor 112a") is associated with a front axle system 120a that includes a differential 124a and front wheels 128a, 128b and the second electric traction motor (also "rear electric traction motor 112b") is associated with a rear axle system 120b that includes a differential 124b and rear wheels 128c, 128d. As shown, the drive shaft disconnect system 116 comprises front wheel end disconnect (WED) units 132a, 132b, but it will be appreciated that the drive shaft disconnect system 116 could also have a front axle disconnect (FAD) type configuration. The electric traction motors 112 are each powered by electrical energy provided (e.g., via a high voltage bus 136) by a high voltage battery pack or system 140. An internal combustion engine 144 is configured to combust a mixture of air and fuel (gasoline, diesel, etc.) to generate mechanical energy that is converted into electrical energy by a motor-generator unit (MGU) 148.

The electrical energy output by the MGU 148 is provided for recharging the high voltage battery system 140 and supporting the high voltage bus 136. A control system 152 including one or more electronic control units (ECUs) is configured to control operation of the electrified vehicle 100, which primarily includes controlling the series hybrid powertrain 108 to generate an amount of drive torque to satisfy a driver torque request provided via a driver interface 156 (e.g., an accelerator pedal). The control system 152 can also receive measurements of various operating parameters of the series hybrid powertrain 108 (speeds, pressures, temperatures, etc.) from a set of sensors 160. An engine torque control system 104 according to the principles of the present application includes the control system 152 and the drive shaft disconnect system 116. The control system 152 could include one or more electronic control units (ECUs). In operation per the techniques of the present application, the control system 152 controls the series hybrid powertrain 108 during closing transitions of the drive shaft disconnect system 116 to mitigate or eliminate the above-described torque delay that could occur when engine torque is increased after the closing transition of the drive shaft disconnect system 116, particularly during low SOC conditions of the high voltage battery system 140. An example configuration of the control system 152 will now be shown and discussed in greater detail.

Figure 2:
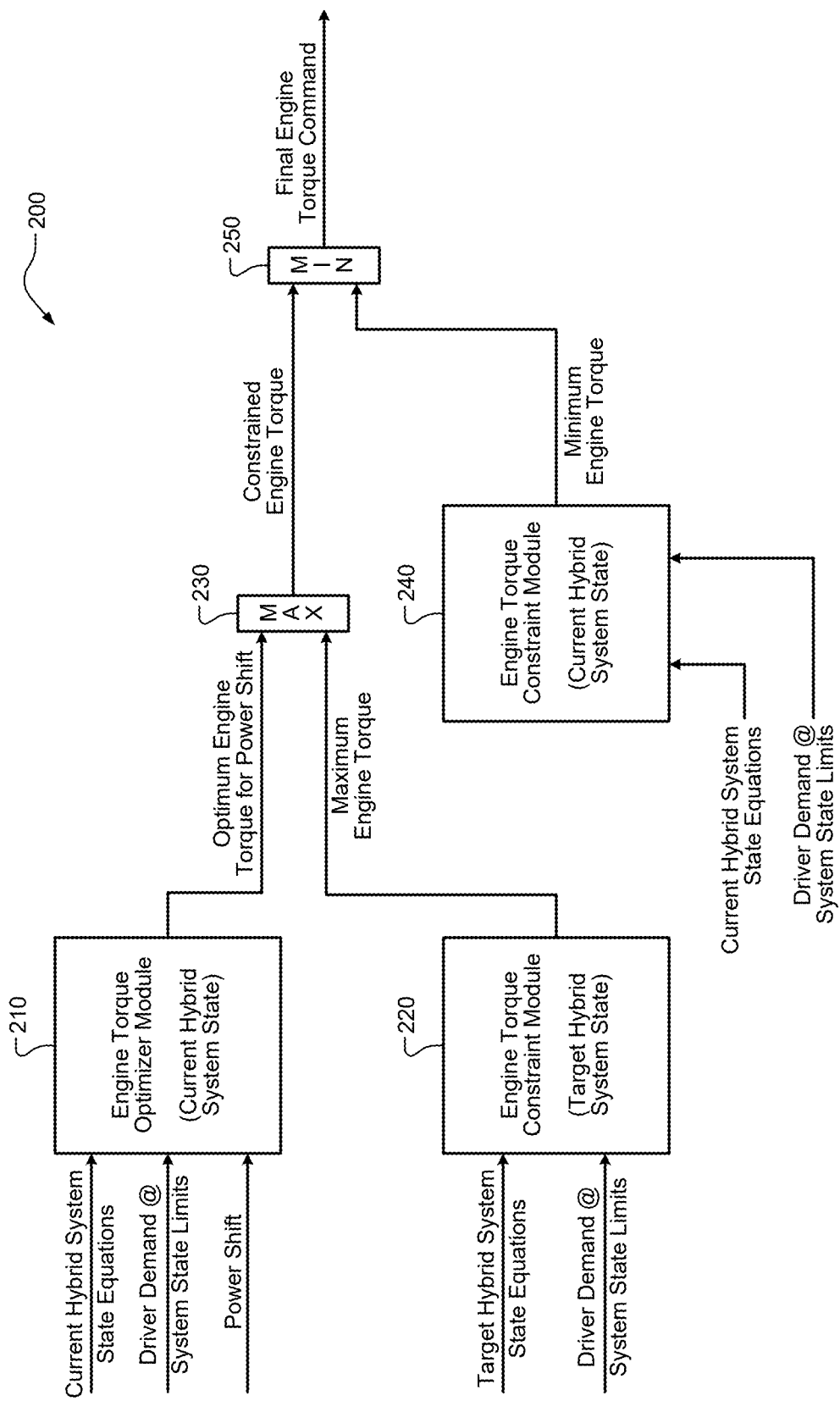
FIG. 2 is a functional block diagram of an example system architecture for an example engine torque control system according to the principles of the present application.

Referring now to FIG. 2 and with continued reference to FIG. 1, a functional block diagram of an example system architecture 200 for the example engine torque control system 104 according to the principles of the present application is illustrated. An engine torque optimizer module 210 is configured to determine an optimum engine torque for a target battery power (drive shaft disconnect system transition), also referred to in FIG. 2 as a "power shift," based on a current state of the series hybrid powertrain 108 (i.e., an open state of the drive shaft disconnect system 116). The inputs to this module 210 include a set of current hybrid system state equations, a driver demand at the current hybrid system state limits, and a signal indicating the request of the power shift. In parallel, a first engine torque constraint module 220 is configured to determine a minimum engine torque for a target state of the series hybrid powertrain 108 (i.e., a closed state of the drive shaft disconnect system 116). The inputs to this module 220 include a set of target hybrid system state equations and a driver demand or torque request at the target hybrid system state limits. The outputs of modules 210 and 220 are fed to a maximum determinator 230 that determines and outputs a maximum of the two values. Further in parallel, a second engine torque constraint module 240 is configured to determine a maximum engine torque for the current state of the series hybrid powertrain 108. The inputs to this module 240 include a set of current hybrid system state equations and a driver demand or torque request at the current hybrid system state limits. The output of this module 240 and the maximum determinator 230 are both fed to a minimum determinator 250 that determines and outputs a minimum of the two values. This output of 250 is the final engine torque command for controlling the engine 144.

As mentioned above, the various modules 210, 220, and 240 are fed, among other signals, current and target hybrid system state equations. In one exemplary implementation, these equations are complex equations relating to an optimal torque split calculation that is known in the art as the "donut space" method. In the donut space method, a quadratic fit for a given speed as a function of commanded motor torque is used and the optimization regions appear donut-shaped on a graph/plot. This donut space method or algorithm is used to determine the overall system limits based on the equations of motion for the given powertrain architecture and the current system conditions, like clutch, motor, battery limits, etc. Example systems parameters that are used by these equations that are fed to modules 210, 220, and 240 include, but are not limited to: system equations of motion, driver demand, actual clutch torques, actual motor speeds, actual engine speed, closed-loop correction values, battery power limits, motor torque limits, engine torque limits, clutch torque limits, axle torque limits, target motor acceleration, target engine acceleration, motor torque-to-power conversion coefficients, and accessor power load. Example system parameters that are also fed to module 210 include, but are not limited to: target battery power (power shift) and cost factors.

Figure 3:
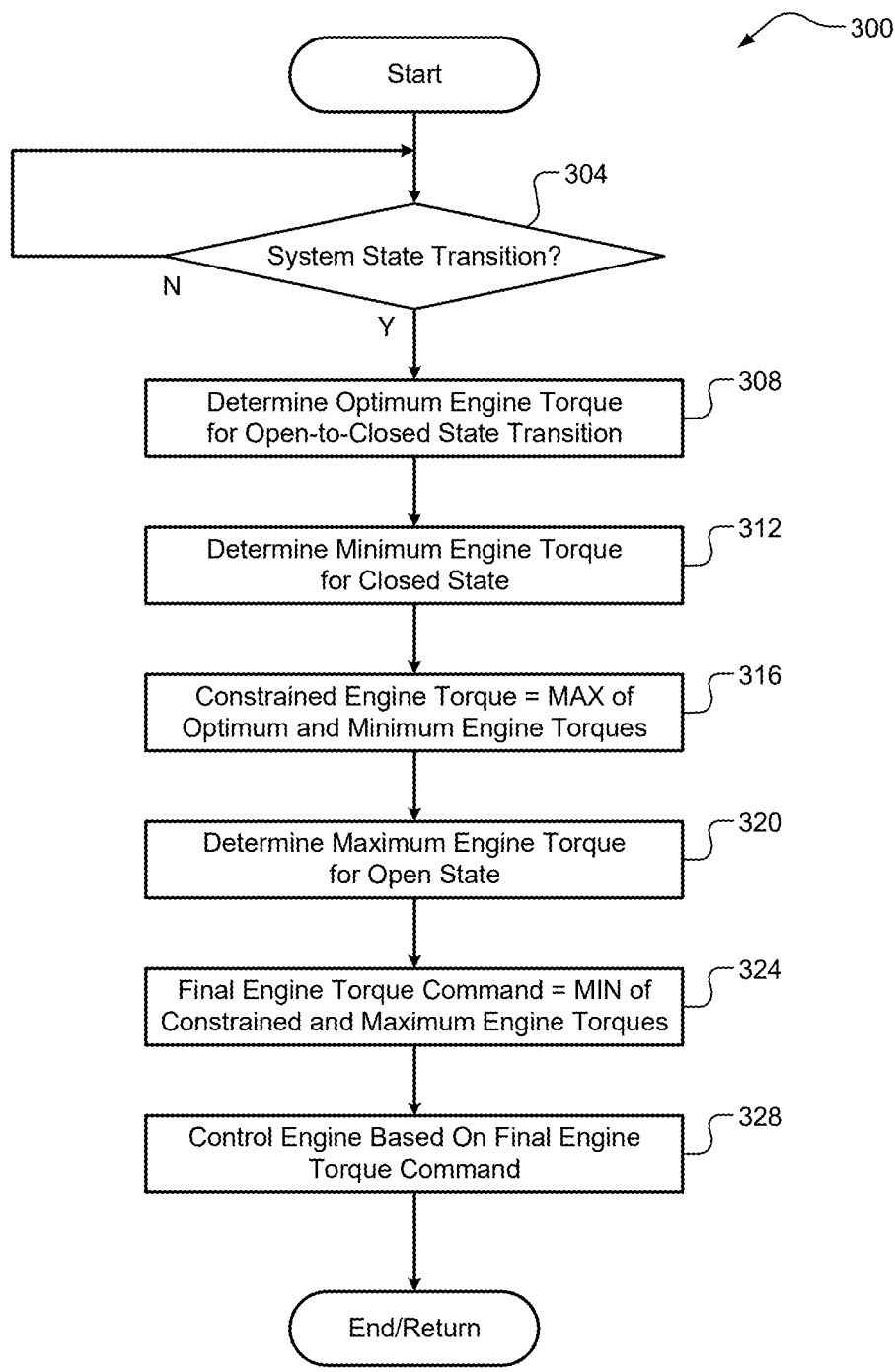
FIG. 3 is a flow diagram of an example engine torque method for an electrified vehicle having a series hybrid powertrain with at least two electric traction motors according to the principles of the present application.

Referring now to FIG. 3 and with continued reference to the previous figures, a flow diagram of an example engine torque method 300 for an electrified vehicle having a series hybrid powertrain with at least two electric traction motors according to the principles of the present application is illustrated. While the method 300 specifically references the electrified vehicle 100 of FIG. 1 and its components for descriptive/illustrative purposes, it will be appreciated that the method 300 could be applicable to any suitable electrified vehicle having a series hybrid powertrain with at least two electric traction motors and a drive shaft disconnect system. The method 300 begins at 304 where the control system 152 detects whether a closing transition of the drive shaft disconnect system 116 is requested. This could be determined or detected, for example, when the drive shaft disconnect system 116 is in an open state and a driver torque request (e.g., from the driver interface 156) exceeds a torque threshold indicative of a need to transition the drive shaft disconnect system 116 from a current open state to a target closed state to thereby allow the first/front electric motor 116a to provide propulsive torque to wheels 128a, 128b.

When false, the method 300 ends or returns to 304. When true, the method 300 proceeds to 308. At 308, the control system determines an optimum engine torque for the target batter power as described above. At 312, the control system 312 determines a minimum engine torque for the target/closed state of the drive shaft disconnect system 116 as described above. At 316, the control system 152 determines a maximum of these values to determine a constrained engine torque. At 320, the control system 152 determines a maximum engine torque for the current/open state of the drive shaft disconnect system 116 as described above. At 324, the control system 152 determines a minimum of the constrained engine torque value and the maximum engine torque to determine a final engine torque command. At 328, the control system 152 controls the engine 144 based on the final engine torque command during the transition from the current/open state to the target/closed state of the drive shaft disconnect system 116. The method 300 then ends or returns to 304 for one or more additional cycles.

It will be appreciated that the terms "controller" and "control system" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An engine torque control system for an electrified vehicle having a series hybrid powertrain with at least two electric traction motors, the engine torque control system comprising:
   a drive shaft disconnect system configured to selectively connect and disconnect a first axle system or a pair of first wheels of the electrified vehicle from a first electric traction motor of the series hybrid powertrain; and
   a control system configured to detect an open-to-closed state transition of the drive shaft disconnect system based on a driver torque request and, in response to detecting the open-to-closed state transition:
      determine an optimum engine torque for the open-to-closed state transition based on a set of parameters for the open state of the drive shaft disconnect system;
      determine engine torque constraints for the open state and the closed state of the drive shaft disconnect system;
      apply the engine torque constraints to the optimum engine torque for the open-to-closed state transition to obtain a final engine torque command; and
      control an engine of the series hybrid powertrain based on the final engine torque command.

2. The engine torque control system of claim 1, wherein the control system is further configured to determine a minimum engine torque constraint based on a set of parameters for the closed state of the drive shaft disconnect system.

3. The engine torque control system of claim 2, wherein the control system is further configured to determine a maximum of the optimum engine torque and the minimum engine torque constraint to obtain a constrained engine torque.

4. The engine torque control system of claim 3, wherein the control system is further configured to determine a maximum engine torque constraint based on the set of parameters for the open state of the drive shaft disconnect system.

5. The engine torque control system of claim 4, wherein the control system is further configured to determine a minimum of the constrained engine torque and the maximum engine torque constraint to obtain the final engine torque command.

6. The engine torque control system of claim 1, wherein the engine is connected to a motor-generator unit (MGU) that is configured to convert mechanical energy generated by the engine to electrical energy for recharging a high voltage battery system of the electrified vehicle, and wherein the high voltage battery system is configured to power the first electric traction motor and a second electric traction motor associated with a second axle system or a pair of second wheels of the electrified vehicle.

7. The engine torque control system of claim 6, wherein the first axle system is a front axle system, the pair of first wheels are a pair of front wheels, the second axle system is a rear axle system, and the pair of second wheels are a pair of rear wheels.

8. The engine torque control system of claim 1, wherein the drive shaft disconnect system is a front axle disconnect (FAD) unit.

9. The engine torque control system of claim 1, wherein the drive shaft disconnect system includes a pair of wheel end disconnect (WED) units.

10. An engine torque control method for an electrified vehicle having a series hybrid powertrain with at least two electric traction motors, the engine torque control method comprising:

detecting, by a control system of the electrified vehicle, an open-to-closed state transition of a drive shaft disconnect system based on a driver torque request, wherein the drive shaft disconnect system is configured to selectively connect and disconnect a first axle system or a pair of first wheels of the electrified vehicle from a first electric traction motor of the series hybrid powertrain; and in response to detecting the open-to-closed state transition:

determining, by the control system, an optimum engine torque for the open-to-closed state transition based on a set of parameters for the open state of the drive shaft disconnect system;

determining, by the control system, engine torque constraints for the open state and the closed state of the drive shaft disconnect system;

applying, by the control system, the engine torque constraints to the optimum engine torque for the open-to-closed state transition to obtain a final engine torque command; and controlling, by the control system, an engine of the series hybrid powertrain based on the final engine torque command.

11. The engine torque control method of claim 10, further comprising determining, by the control system, a minimum engine torque constraint based on a set of parameters for the closed state of the drive shaft disconnect system.

12. The engine torque control method of claim 11, further comprising determining, by the control system, a maximum of the optimum engine torque and the minimum engine torque constraint to obtain a constrained engine torque.

13. The engine torque control method of claim 12, further comprising determining, by the control system, a maximum engine torque constraint based on the set of parameters for the open state of the drive shaft disconnect system.

14. The engine torque control method of claim 13, further comprising determining, by the control system, a minimum of the constrained engine torque and the maximum engine torque constraint to obtain the final engine torque command.

15. The engine torque control method of claim 10, wherein the engine is connected to a motor-generator unit (MGU) that is configured to convert mechanical energy generated by the engine to electrical energy for recharging a high voltage battery system of the electrified vehicle, and wherein the high voltage battery system is configured to power the first electric traction motor and a second electric traction motor associated with a second axle system or a pair of second wheels of the electrified vehicle.

16. The engine torque control method of claim 15, wherein the first axle system is a front axle system, the pair of first wheels are a pair of front wheels, the second axle system is a rear axle system, and the pair of second wheels are a pair of rear wheels.

17. The engine torque control method of claim 10, wherein the drive shaft disconnect system is a front axle disconnect (FAD) unit.

18. The engine torque control method of claim 10, wherein the drive shaft disconnect system includes a pair of wheel end disconnect (WED) units.

* * * * *